US011710986B2

(12) United States Patent
Leutgeb et al.

(10) Patent No.: US 11,710,986 B2
(45) Date of Patent: Jul. 25, 2023

(54) NEAR-FIELD COMMUNICATION DEVICE, ELECTRONIC DEVICE FOR PROVIDING A SUBSTANCE, METHOD FOR OPERATING A NEAR-FIELD COMMUNICATION DEVICE AND METHOD FOR PROVIDING A SUBSTANCE

(71) Applicant: Infineon Technologies AG, Neubiberg (DE)

(72) Inventors: Thomas Leutgeb, Lieboch (AT); Walter Kargl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/374,216

(22) Filed: Jul. 13, 2021

(65) Prior Publication Data

US 2022/0021244 A1    Jan. 20, 2022

(30) Foreign Application Priority Data

Jul. 14, 2020 (DE) .......................... 102020118575.8

(51) Int. Cl.
*H02J 50/40* (2016.01)
*H02J 50/10* (2016.01)
*H02J 50/80* (2016.01)
*H02J 50/23* (2016.01)

(52) U.S. Cl.
CPC .............. *H02J 50/40* (2016.02); *H02J 50/10* (2016.02); *H02J 50/23* (2016.02); *H02J 50/402* (2020.01); *H02J 50/80* (2016.02)

(58) Field of Classification Search
CPC .......... H02J 50/23; H02J 50/402; H02J 50/40; H02J 50/80; H04B 5/00; H04B 5/0025; H04B 5/0031; H04B 5/0027
See application file for complete search history.

(56) References Cited

U.S. PATENT DOCUMENTS

| 6,181,001 | B1 * | 1/2001 | Ikefuji | ............... G06K 19/0775 |
| | | | | 257/679 |
| 2013/0309964 | A1 * | 11/2013 | Hall | ........................ H04B 5/00 |
| | | | | 455/41.1 |
| 2014/0015642 | A1 * | 1/2014 | White | ................ G06K 7/10168 |
| | | | | 340/10.1 |

(Continued)

OTHER PUBLICATIONS

German Patent Office, Office Action issued for DE 102020118575.8, 11 pgs., dated Jun. 16, 2021.

*Primary Examiner* — Rexford N Barnie
*Assistant Examiner* — Rasem Mourad
(74) *Attorney, Agent, or Firm* — Banner & Witcoff Ltd.

(57) ABSTRACT

A near-field communication device having one or more processors configured to control the near-field communication device, an energy supplier having an energy supply circuit and a supply antenna configured to provide energy to a second antenna circuit arranged externally to the near-field communication device, wherein the supply antenna of the energy supplier is galvanically coupled to the energy supply circuit, and a first antenna circuit having a first communication circuit and a first antenna, wherein the first communication circuit is configured for communication with a second communication circuit of the second antenna circuit by means of an inductive coupling by means of the first antenna of the first antenna circuit.

8 Claims, 5 Drawing Sheets

(56) References Cited

U.S. PATENT DOCUMENTS

| | | | |
|---|---|---|---|
| 2015/0028689 A1* | 1/2015 | Arisawa | G01R 19/0084 |
| | | | 307/104 |
| 2017/0005525 A1* | 1/2017 | Lecias, Jr. | H02J 50/80 |
| 2018/0337558 A1* | 11/2018 | Muramatsu | H04W 52/247 |
| 2020/0044482 A1* | 2/2020 | Partovi | H02J 50/05 |
| 2021/0307149 A1* | 9/2021 | Shi | H02J 50/10 |

* cited by examiner

NEAR-FIELD COMMUNICATION DEVICE, ELECTRONIC DEVICE FOR PROVIDING A SUBSTANCE, METHOD FOR OPERATING A NEAR-FIELD COMMUNICATION DEVICE AND METHOD FOR PROVIDING A SUBSTANCE

TECHNICAL FIELD

The disclosure relates to a near-field communication device, an electronic device for providing a substance, a method for operating a near-field communication device and a method for providing a substance.

BACKGROUND

Some near-field communication applications which use a non-galvanic transmission path for communication and/or energy transmission face the problem that they require a fully equipped (active) read circuit on a master side and, if security applications are additionally intended to be provided, a secure element as well.

Accordingly, hitherto manufacturers have either actually provided the fully equipped—and accordingly complex or expensive—read circuit or alternatively provided contact-based interfaces (with all the usual disadvantages thereof).

SUMMARY

In various exemplary embodiments, a near-field communication device is provided which comprises an antenna fed by an energy supply circuit for transmitting energy to two passive contactless devices (each likewise comprising an antenna), one on a master side and one on a slave side.

In various exemplary embodiments, communication between the two passive devices is made possible by the two passive devices being configured to couple (inductively) to the energy-supplying antenna, and as a result (indirectly) to one another as well.

In various exemplary embodiments, a symmetrical communication protocol can be used. The devices can be operated as passive devices with the same characteristic and can communicate with one another by means of the energy-supply antenna.

In various exemplary embodiments, an inexpensive system comprising reader (or reading device) and identification ("tag") can be provided which makes it possible to dispense with providing a complete active reading device.

BRIEF DESCRIPTION OF THE DRAWINGS

Exemplary embodiments of the disclosure are illustrated in the figures and are explained in greater detail below.

In the figures.

DETAILED DESCRIPTION

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figures(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present disclosure. It goes without saying that the features of the various exemplary embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected", "attached" and "coupled" are used to describe both a direct and an indirect connection, a direct or indirect attachment and a direct or indirect coupling. In the figures, identical or similar elements are provided with identical reference signs, insofar as this is expedient.

Figure 1A:
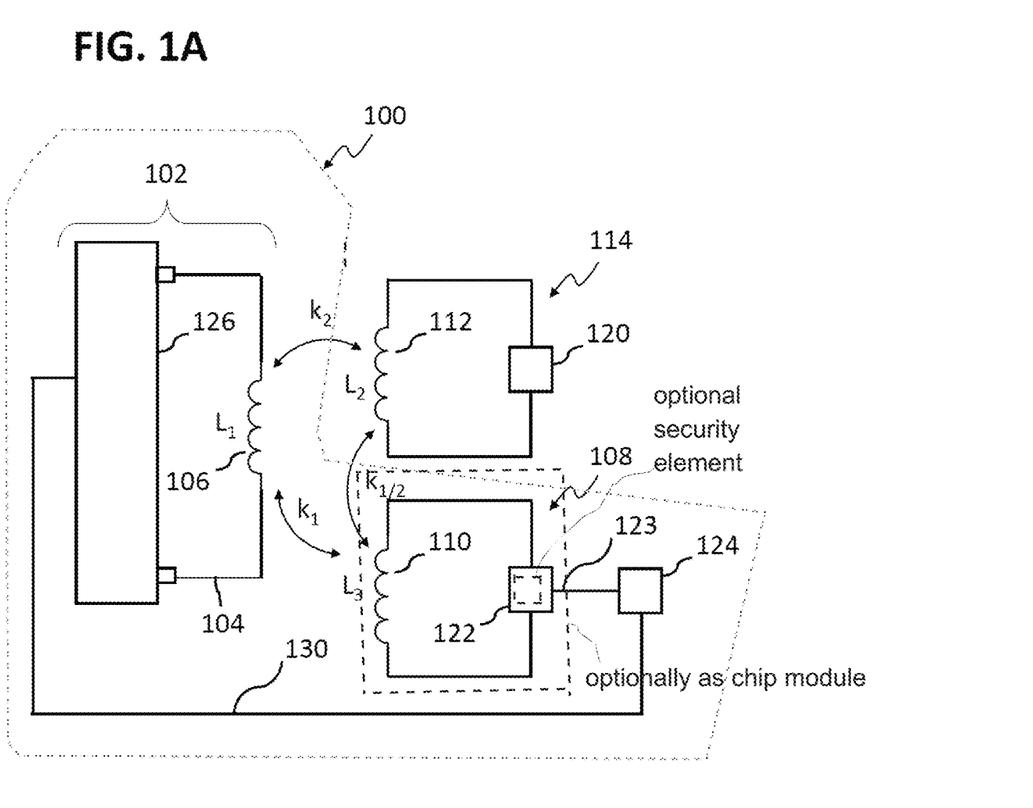
FIGS. 1A and 1B each show a schematic illustration of a near-field communication device in accordance with various exemplary embodiments and a second antenna device.
Figure 1B:
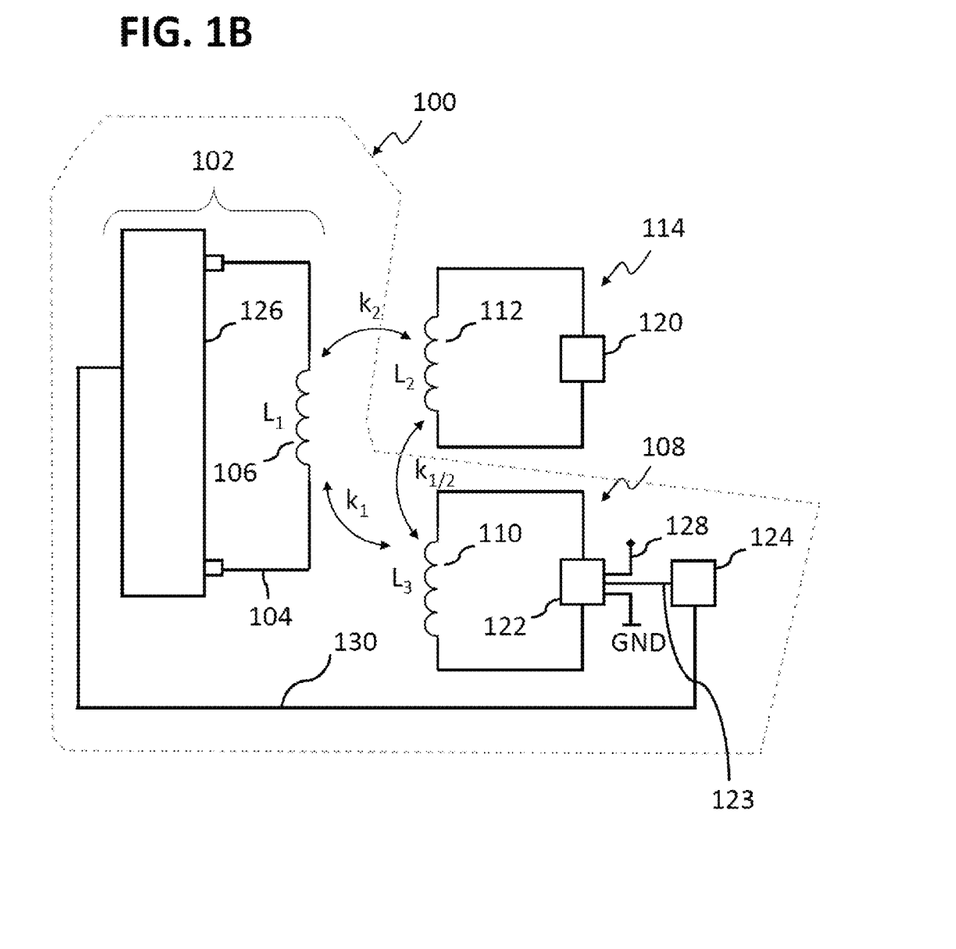

FIGS. 1A and 1B each show a schematic illustration of a near-field communication device 100 in accordance with various exemplary embodiments. The near-field communication device 100 can be configured for communication with a second antenna device 114, which is likewise illustrated in FIG. 1A and FIG. 1B and is not part of the near-field communication device 100, i.e. is external thereto.

The second antenna device 114 can be configured for communication with the near-field communication device 100.

The fact that the near-field communication device 100 in FIG. 1A and FIG. 1B, respectively, communicates with the second antenna device 114, or both are able to communicate with one another, is indicated by the coupling factors $k_1$, $k_2$ and $k_{1/2}$.

The near-field communication device 100 can comprise an energy supply unit 102, which can comprise an energy supply circuit 126 and an antenna 106. The antenna 106 of the energy supply unit 102 can be galvanically coupled to the energy supply circuit 126, for example by means of electrically conductive connections 104.

The energy supply unit 102 can be configured for providing energy to the second antenna device 114. By way of example, the energy supply circuit 126 can comprise an antenna driver for operating the antenna 106 in a transmission operating mode, wherein the antenna 106 and the energy supply circuit 126 can be configured (e.g. coordinated) such that the signal transmitted by means of the antenna 106 can be received by the antenna 112 of the second antenna device 114.

In various exemplary embodiments, the received signal can serve as energy supply for the second antenna device, for example for a second communication circuit 120, which can be part of the second antenna device 114.

The near-field communication device 100 can furthermore comprise a first antenna device 108 comprising a first communication circuit 122 and an antenna 110.

In various exemplary embodiments, the first antenna device 108 and/or the second antenna device 114 can be formed in each case as a chip module with integrated antenna 110 and 112, respectively.

The first communication circuit 122 can be designed as a security circuit, for example. It can comprise for example a secure element, e.g. a (micro)processor or (micro)controller configured for security applications such as authentications and/or cryptographic applications. It can be configured to carry out an authentication of the second communication circuit 120. The first communication circuit 122 can be regarded as a master in a master-slave system.

The second communication circuit 120 can for example likewise be designed as a security circuit. It can comprise for example a secure element, e.g. a (micro)processor or (micro) controller configured for security applications such as authentications and/or cryptographic applications. It can be configured to provide an identification for authentication to the first communication circuit 122. The second communication circuit 120 can be regarded as a slave in a master-slave system.

The first communication circuit 122 can be configured for communication with the second communication circuit 120 of the second antenna device 114 by means of an inductive coupling by means of the antenna 110 of the first antenna device 108.

In various exemplary embodiments, the communication between the first communication circuit 122 and the second communication circuit 120 can be effected indirectly, for example by means of a load modulation of the signal that is provided both to the first communication circuit 122 and to the second communication circuit 120 by means of the antenna 106 of the energy supply unit 102.

By virtue of the fact that, in various exemplary embodiments, a symmetrical communication protocol is used, the first communication circuit 122 and the second communication circuit 120 can be operated as passive devices with the same characteristic and can communicate with one another by means of the antenna 106 of the energy supply unit 102.

The communication can be effected for example as pure load modulation, for example by means of an NFC-F (FeliCa) modulation scheme.

In various exemplary embodiments, the inductive coupling by means of the antenna 110 of the first antenna device 108 can comprise an inductive coupling between the antenna 106 of the energy supply circuit 102 and the antenna 110 of the first antenna device 108, which can be characterized by the coupling factor $k_1$. In that case, an inductive coupling between the antenna 110 of the first antenna device 108 and the antenna 120 of the second antenna device 114 can furthermore comprise an inductive coupling between the antenna 112 of the energy supply circuit 102 and the antenna 112 of the second antenna device 114, which can be characterized by the coupling factor $k_2$.

Alternatively or additionally, in various exemplary embodiments, the inductive coupling by means of the antenna 110 of the first antenna device 108 can comprise an inductive coupling between the antenna 110 of the first antenna device 108 and the antenna 112 of the second antenna device 120. This coupling can be characterized by the coupling factor $k_{1/2}$.

The coupling factors $k_1$ and $k_2$, respectively, can be stronger than the coupling factor $k_{1/2}$. To put it another way, the energy supply unit 102, the second antenna device 114 and the first antenna device 108 can be configured such that a coupling between the energy supply unit 102 and the first antenna device 108 or respectively a coupling between the energy supply unit 102 and the second antenna device 114 is strong, for example stronger than a direct coupling between the first antenna device 108 and the second antenna device 114.

Accordingly, in various exemplary embodiments, the indirect communication between the first antenna device 108 and the second antenna device 114 can be more efficient than the direct communication between the first antenna device 108 and the second antenna device 114.

In various exemplary embodiments, in the case of the near-field communication device 100, the antenna 110 of the first antenna device 108 can be galvanically coupled to at least one processor 124 of the one or more processors, for example by means of an electrically conductive connection 123.

The near-field communication device 100 can comprise one or more processors 124 for controlling the near-field communication device 100. The processor 124 can comprise for example one or more CPUs, for example in the form of microprocessors.

The processor 124 can be part of a controller, e.g. of a microcontroller, and can be configured for example to start and/or to stop or to control or to regulate an energy transmission (i.e. a transmission process) by means of the energy supply unit 102.

The processor 124 can furthermore be configured to control the first antenna device 108 such that the latter carries out or is ready to carry out a transmission and/or reception process.

In various exemplary embodiments, the near-field communication device 100 can be configured to detect the second antenna device 114 approaching the first antenna device 108 and/or the presence of the second antenna device 114 within a detection and/or communication region in the vicinity of the first antenna device 108, for example inductively by means of the energy supply unit and/or the first antenna device 108 itself, and/or by means of an additional sensor (not illustrated), for example a mechanical sensor or switch.

The near-field communication device 100 can be configured, upon detection of the second antenna device 114, to commence its operation in order to enable the communication between the first antenna device and the second antenna device 114.

For this purpose, the energy supply unit 102 can be supplied with energy. The energy supply is not illustrated in FIG. 1A. It can be provided for example by means of an energy source coupled (e.g. conductively) to the energy supply unit 102, e.g. a (rechargeable) battery (illustrated by way of example in FIG. 2 as battery 234, which supplies an additional processor 232 and a heating element 230 with energy, and can also be used for the energy supply unit 102).

In various exemplary embodiments, the energy source which supplies the energy supply unit 102 with energy can also supply the processor 124 and the first communication circuit 122 with energy directly (by means of terminals 128 and electrically conductive connections 123, 130 suitable for transmitting energy and optionally information). That is illustrated by way of example in FIG. 1B.

In various exemplary embodiments, the energy source which supplies the energy supply unit 102 with energy can supply the first communication circuit 122 with energy indirectly, e.g. by means of inductive coupling.

Figure 2:
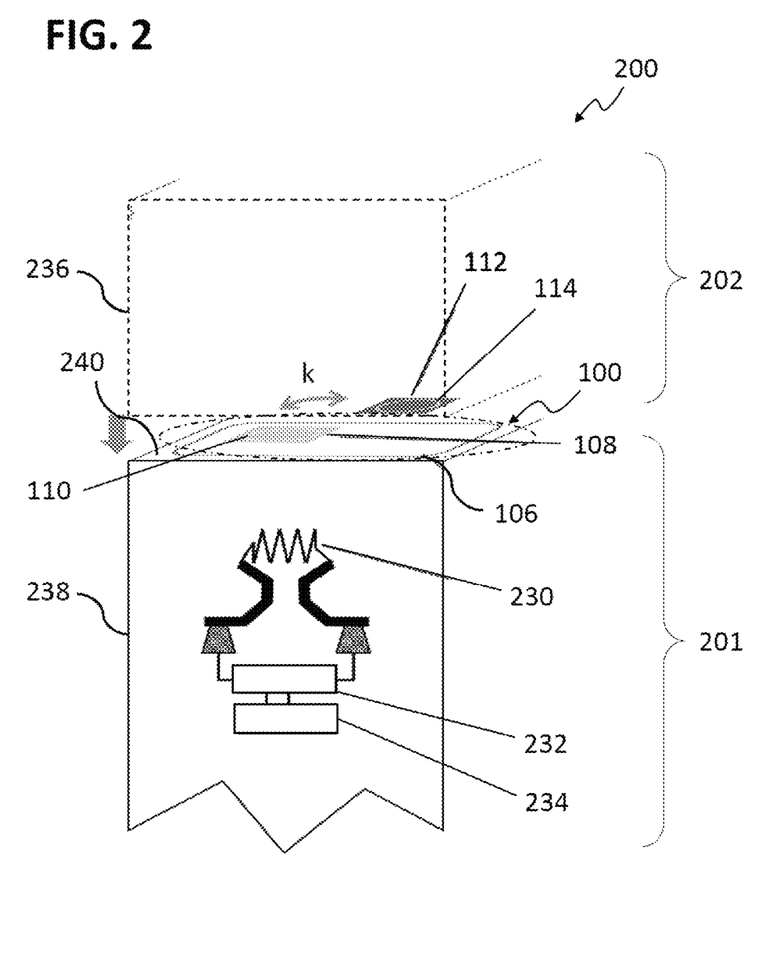
FIG. 2 shows a schematic illustration of an electronic device for providing a substance in accordance with various exemplary embodiments, which is coupled to a container.

FIG. 2 is a schematic illustration of an electronic device 201 for providing a substance in accordance with various exemplary embodiments, which is coupled to a coupling module 202, in which the substance to be provided is situated. The electronic device 201 together with the coupling module 202 forms the electronic system 200.

The electronic device 201 can comprise a near-field communication device 100 in accordance with any of the exemplary embodiments.

The electronic device 201, which can also be referred to as a base module, can comprise a body 238, an energy source 234 (e.g. an (optionally rechargeable) battery), an additional processor 232 and a providing device 230.

The coupling module 202 can comprise a container 236 which accommodates the substance and to which the second antenna device 114 is fitted.

The electronic device 201 can furthermore comprise a coupling region 240 for coupling to the coupling module 202. The coupling region 240 can be defined such that communication as described above between the first antenna device 108 and the second antenna device 114 is possible when the coupling module 202 is arranged within the coupling region 240.

In various exemplary embodiments, the coupling region 240 can furthermore be designed so as to enable (optionally temporary) securing of the coupling module 202 in the coupling region 240.

In various exemplary embodiments, the additional processor 232 can be configured to control dispensing of the substance on the basis of the communication between the first communication circuit 122 and the second communication circuit 120, for example by means of controlling the providing device 230.

In FIG. 2, the electronic device 201 is illustrated as a base module of an electronic inhalation device, and the substance is an inhalation liquid accommodated in a so-called pod forming the coupling module 202.

By means of the antenna of the first device 108 and the energy supply unit 102 likewise provided in the electronic device (in particular by means of the antenna 106), the first communication circuit 122 in the electronic device 201 (the base module) can communicate with the second communication circuit 120, which is arranged as part of the second antenna device 114 in the coupling module 202 (the pod), for example inductively as described above, e.g. in association with FIG. 1A and FIG. 1B.

By way of example, the first communication circuit 122 can request and verify an identification from the second communication circuit 120 and enable the additional processor 232 to provide the substance by means of the providing device 230 only after successful verification.

The providing device 230 is illustrated symbolically as a heating filament for vaporizing the substance in FIG. 2. In the case of the electronic inhalation device (e.g. an E-cigarette) the providing device 230 can optionally comprise further elements, e.g. valves or the like, which make it possible to control the provision of the (vaporized) substance to a user.

In various exemplary embodiments, the electronic device 201 can be a printer, and the substance can be a printable substance, for example an ink or a toner.

The coupling module 202 can accordingly be a toner cartridge or ink cartridge. The use of the communication between the first communication circuit 122 and the second communication circuit 120 as described above for the electronic inhalation device can apply, mutatis mutandis, to the printer and the toner cartridge or ink cartridge, in particular the fact that the toner or the ink can be provided only after authentication of the toner cartridge or ink cartridge by the printer.

Figure 3:
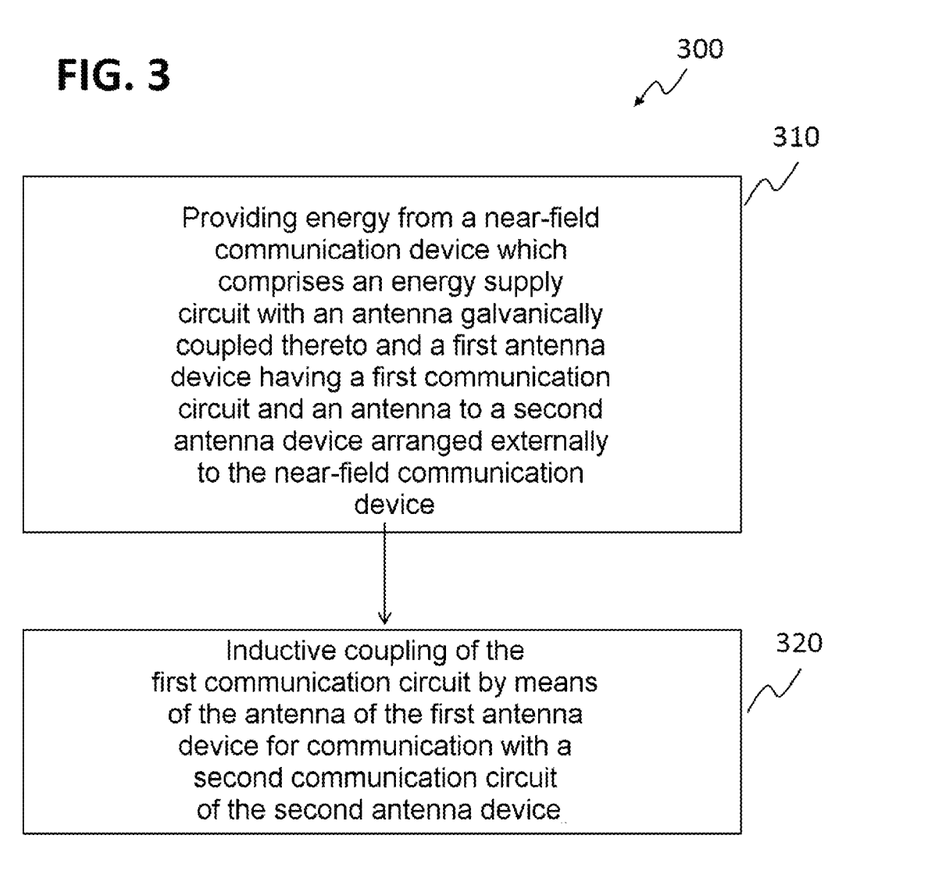
FIG. 3 shows a flow diagram of a method for operating a near-field communication device.

FIG. 3 shows a flow diagram 300 of a method for operating a near-field communication device which comprises an energy supply circuit with an antenna galvanically coupled thereto and a first antenna device having a first communication circuit and an antenna.

The method can comprise providing energy to a second antenna device arranged externally to the near-field communication device (at 310), and inductive coupling of the first communication circuit by means of the antenna of the first antenna device for communication with a second communication circuit of the second antenna device (at 320).

Figure 4:
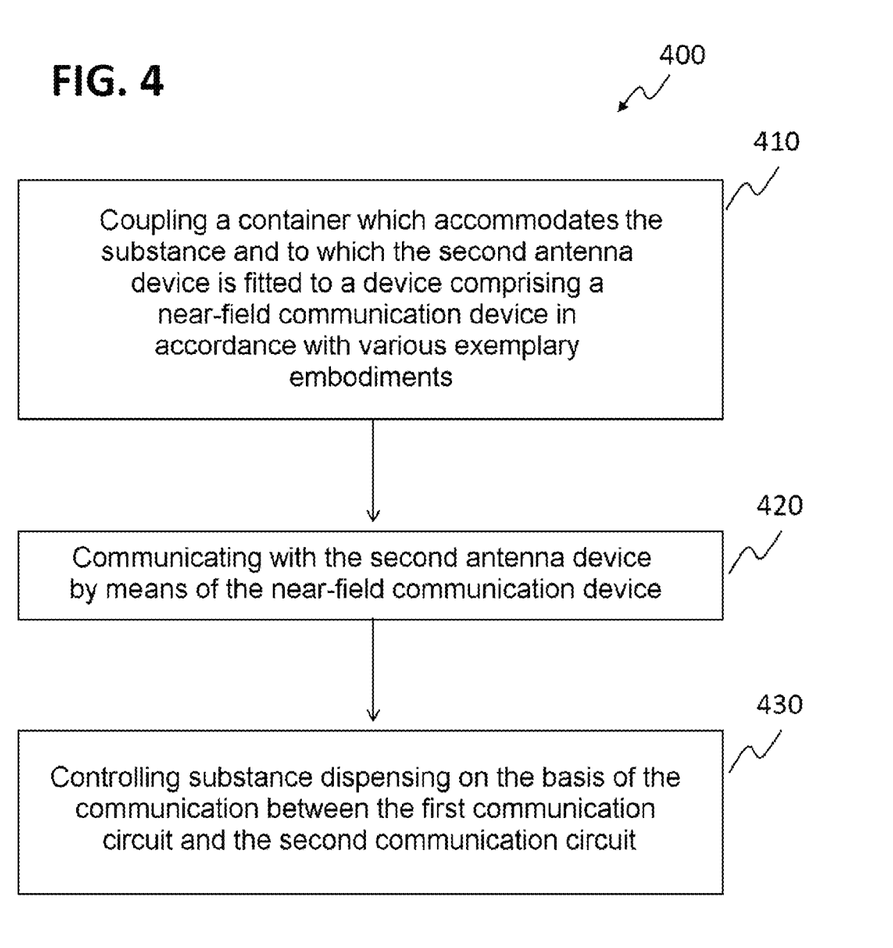
FIG. 4 shows a flow diagram of a method for providing a substance.

FIG. 4 shows a flow diagram 400 of a method for providing a substance.

The method can comprise coupling a container which accommodates the substance and to which the second antenna device is fitted to a device comprising a near-field communication device in accordance with one of the exemplary embodiments (at 410); communicating with the second antenna device by means of the near-field communication device (at 420); and controlling substance dispensing on the basis of the communication between the first communication circuit and the second communication circuit (at 430).

Some exemplary embodiments are specified in summary below.

Exemplary embodiment 1 is a near-field communication device. The near-field communication device comprises one or more processors for controlling the near-field communication device, an energy supply unit comprising an energy supply circuit and an antenna for providing energy to a second antenna device arranged externally to the near-field communication device, wherein the antenna of the energy supply unit is galvanically coupled to the energy supply circuit, and a first antenna device comprising a first communication circuit and an antenna, wherein the first communication circuit is configured for communication with a second communication circuit of the second antenna device by means of an inductive coupling by means of the antenna of the first antenna device.

Exemplary embodiment 2 is a near-field communication device in accordance with exemplary embodiment 1, wherein the inductive coupling is provided by means of an inductive coupling between the antenna of the energy supply circuit and the antenna of the first antenna device and/or an inductive coupling between the antenna of the first antenna device and the antenna of the second antenna device.

Exemplary embodiment 3 is a near-field communication device in accordance with exemplary embodiment 1 or 2, wherein the first communication circuit is configured for communication with a second communication circuit of the second antenna device by means of a load modulation of the inductive coupling.

Exemplary embodiment 4 is a near-field communication device in accordance with any of exemplary embodiments 1 to 3, wherein the antenna of the first antenna device is galvanically coupled to at least one processor of the one or more processors.

Exemplary embodiment 5 is a near-field communication device in accordance with any of exemplary embodiments 1 to 4, wherein the first antenna device is formed as a chip module with integrated antenna.

Exemplary embodiment 6 is a near-field communication device in accordance with any of exemplary embodiments 1 to 5, wherein the first communication circuit is supplied with energy by the energy supply circuit by means of inductive coupling.

Exemplary embodiment 7 is a near-field communication device in accordance with any of exemplary embodiments 1 to 6, wherein the first communication circuit comprises a security element configured to carry out an authentication of the second antenna device.

Exemplary embodiment 8 is a near-field communication device in accordance with any of exemplary embodiments 1 to 7, wherein the antenna of the first antenna device is configured for inductive coupling to the antenna of the energy supply unit.

Exemplary embodiment 9 is an electronic device for providing a substance. The electronic device comprises a coupling region for coupling to a container which accommodates the substance and to which the second antenna device is fitted, a near-field communication device in accordance with any of exemplary embodiments 1 to 8, and an additional processor configured to control dispensing of the substance on the basis of the communication between the first communication circuit and the second communication circuit.

Exemplary embodiment 10 is an electronic device in accordance with exemplary embodiment 9, wherein the electronic device is an inhalation device, and wherein the substance is an inhalation liquid.

Exemplary embodiment 11 is an electronic device in accordance with exemplary embodiment 9, wherein the electronic device is a printer, and wherein the substance is a printable substance, for example an ink or a toner.

Exemplary embodiment 12 is an electronic device in accordance with any of exemplary embodiments 9 to 11, wherein the communication comprises an authentication of the second communication circuit.

Exemplary embodiment 13 is a method for operating a near-field communication device which comprises an energy supply circuit with an antenna galvanically coupled thereto and a first antenna device having a first communication circuit and an antenna. The method comprises providing energy to a second antenna device arranged externally to the near-field communication device, and inductive coupling of the first communication circuit by means of the antenna of the first antenna device for communication with a second communication circuit of the second antenna device.

Exemplary embodiment 14 is a method in accordance with exemplary embodiment 13, wherein the inductive coupling comprises inductive coupling of the antenna of the energy supply circuit and the antenna of the first antenna device, and/or inductive coupling of the antenna of the first antenna device and the antenna of the second antenna device.

Exemplary embodiment 15 is a method in accordance with exemplary embodiment 13 or 14, wherein the first communication circuit is configured for communication with a second communication circuit of the second antenna device by means of a load modulation of the inductive coupling.

Exemplary embodiment 16 is a method in accordance with any of exemplary embodiments 13 to 15, wherein the antenna of the first antenna device is galvanically coupled to at least one processor for controlling the near-field communication device.

Exemplary embodiment 17 is a method in accordance with any of exemplary embodiments 13 to 16, wherein the first antenna device is formed as a chip module with integrated antenna.

Exemplary embodiment 18 is a method in accordance with exemplary embodiment 16 or 17, which furthermore comprises inductive coupling for supplying the first communication circuit with energy by means of the energy supply circuit.

Exemplary embodiment 19 is a method in accordance with any of exemplary embodiments 13 to 18, which furthermore comprises authenticating the second antenna device.

Exemplary embodiment 20 is a method in accordance with any of exemplary embodiments 13 to 19, which furthermore comprises inductive coupling of the antenna of the first antenna device to the antenna of the energy supply unit.

Exemplary embodiment 21 is a method for providing a substance. The method can comprise coupling a container which accommodates the substance and to which the second antenna device is fitted to a device comprising a near-field communication device as claimed in any of claims 1 to 8, communicating with the second antenna device by means of the near-field communication device, and controlling substance dispensing on the basis of the communication between the first communication circuit and the second communication circuit.

Exemplary embodiment 22 is a method in accordance with exemplary embodiment 21, wherein the electronic device is an inhalation device, and wherein the substance is an inhalation liquid.

Exemplary embodiment 23 is a method in accordance with exemplary embodiment 21, wherein the electronic device is a printer, and wherein the substance is a printable substance, for example an ink or a toner.

Exemplary embodiment 24 is a method in accordance with any of exemplary embodiments 21 to 23, wherein the communicating comprises authenticating the second communication circuit.

Further advantageous configurations of the device are evident from the description of the method, and vice versa.

The invention claimed is:

1. A near-field communication device, comprising:
one or more processors operable to control the near-field communication device;
an energy supplier comprising an energy supply circuit and an energy supply antenna galvanically coupled to the energy supply circuit,
wherein the energy supply circuit is to provide energy to a second communication circuit of a second antenna circuit via inductive coupling between the energy supply antenna and a second antenna of the second antenna circuit, which is arranged externally to the near-field communication device; and
a first antenna circuit comprising a first antenna and a first communication circuit to communicate with the second communication circuit via inductive coupling between the first antenna and the second antenna,
wherein the energy supply circuit is further to provide energy to the first communication circuit via inductive coupling between the energy supply antenna and the first antenna, for the first communication circuit to use the energy as operating power, and
wherein the first communication circuit is operable to communicate with the second communication circuit by a load modulation of the inductive coupling between the first antenna and the second antenna while the energy supply circuit drives the inductive coupling between the energy supply antenna, the first antenna, and the second antenna.

2. The near-field communication device as claimed in claim 1, wherein the first antenna of the first antenna circuit is galvanically coupled to at least one processor of the one or more processors.

3. The near-field communication device as claimed in claim 1, wherein the first antenna circuit is formed as a chip module with the first antenna as an integrated antenna.

4. The near-field communication device as claimed in claim 1, wherein the first communication circuit comprises a security element configured to carry out an authentication of the second antenna circuit.

5. A method for operating a near-field communication device which comprises an energy supplier including an energy supply circuit and an energy supply antenna galvanically coupled to the energy supply circuit, and a first antenna circuit having a first antenna and a first communication circuit to communicate with a second communication circuit of a second antenna circuit, which is arranged externally to the near-field communication device, via inductive coupling between the first antenna and a second antenna of the second antenna circuit, the method comprising:

providing energy from the energy supply circuit to the second communication circuit via inductive coupling between the energy supply antenna and the second antenna;

communicating by the first communication circuit with the second communication circuit via inductive coupling between the first antenna and the second antenna;

providing energy from the energy supply circuit to the first communication circuit via inductive coupling between the energy supply antenna and the first antenna, for the first communication circuit to use the energy as operating power; and communicating by the first communication circuit with the second communication circuit by a load modulation of the inductive coupling between the first antenna and the second antenna while the energy supply circuit drives the inductive coupling between the energy supply antenna, the first antenna, and the second antenna.

6. The method as claimed in claim 5, wherein the first antenna of the first antenna circuit is galvanically coupled to at least one processor operable to control the near-field communication device.

7. The method as claimed in claim 5, wherein the first antenna circuit is formed as a chip module with the first antenna as an integrated antenna.

8. The method as claimed in claim 5, further comprising:

authenticating the second antenna circuit.

* * * * *